United States Patent
Kwon et al.

(10) Patent No.: US 8,548,076 B2
(45) Date of Patent: Oct. 1, 2013

(54) RETRANSMISSION APPARATUS AND METHOD

(75) Inventors: DongSeung Kwon, Daejeon (KR); Byung-Jae Kwak, Daejeon (KR); Bum-Soo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 168 days.

(21) Appl. No.: 13/061,639

(22) PCT Filed: Aug. 27, 2009

(86) PCT No.: PCT/KR2009/004785
§ 371 (c)(1),
(2), (4) Date: May 27, 2011

(87) PCT Pub. No.: WO2010/024603
PCT Pub. Date: Mar. 4, 2010

(65) Prior Publication Data
US 2011/0222626 A1    Sep. 15, 2011

(30) Foreign Application Priority Data

Sep. 1, 2008    (KR) .................. 10-2008-0085928
Aug. 6, 2009    (KR) .................. 10-2009-0072511

(51) Int. Cl.
*H04K 1/10*    (2006.01)
(52) U.S. Cl.
USPC .......................................... 375/260; 375/295
(58) Field of Classification Search
USPC ................... 375/260, 295, 298, 299
See application file for complete search history.

(56) References Cited

U.S. PATENT DOCUMENTS

| | | | |
|---|---|---|---|
| 7,133,462 B2 | 11/2006 | Ha et al. | |
| 7,362,733 B2 | 4/2008 | Kim et al. | |
| 8,000,410 B2 * | 8/2011 | Wengerter et al. | 375/298 |
| 8,320,486 B2 * | 11/2012 | Kotecha | 375/267 |
| 2003/0097629 A1 | 5/2003 | Moon et al. | |
| 2006/0234628 A1 * | 10/2006 | Horiguchi et al. | 455/39 |
| 2008/0260067 A1 * | 10/2008 | Wengerter et al. | 375/298 |
| 2009/0304109 A1 * | 12/2009 | Kotecha | 375/299 |
| 2011/0274212 A1 * | 11/2011 | Edler Von Elbwart et al. | 375/308 |
| 2012/0087363 A1 * | 4/2012 | Jongren et al. | 370/342 |

FOREIGN PATENT DOCUMENTS

| | | |
|---|---|---|
| KR | 2003-0032381 | 4/2003 |
| KR | 10-2003-0035582 | 5/2003 |
| KR | 10-2003-0042072 | 5/2003 |
| KR | 2003-0037191 | 5/2003 |
| KR | 10-0528419 | 11/2005 |
| KR | 10-2008-0015851 | 2/2008 |
| WO | 02/067491 A1 | 8/2002 |
| WO | 2006/119794 A1 | 11/2006 |

OTHER PUBLICATIONS

Ch. Wengerter et al., "Advanced Hybrid ARQ Technique Employing a Signal Constellation Rearrangement," IEEE, Jan. 29, 2009, p. 2002-2006.

* cited by examiner

*Primary Examiner* — Emmanuel Bayard
(74) *Attorney, Agent, or Firm* — Staas & Halsey LLP

(57) ABSTRACT

A retransmission method maps at least some bits of codeword to symbols according to a first modulation method at the time of first transmission. The retransmission method maps at least some bits of the codeword to symbols according to a second modulation method that is different from the first modulation method at the time of second transmission after the first transmission. In this case, the second modulation method may have a lower modulation order than that of the first modulation method, or a sum of average reliability per bit of symbol according to the second modulation may be larger than a sum of average reliability per bit of symbol according to the first modulation method.

19 Claims, 4 Drawing Sheets

Fig. 3
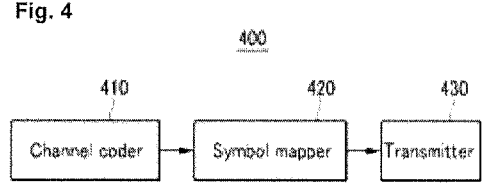
Fig. 4
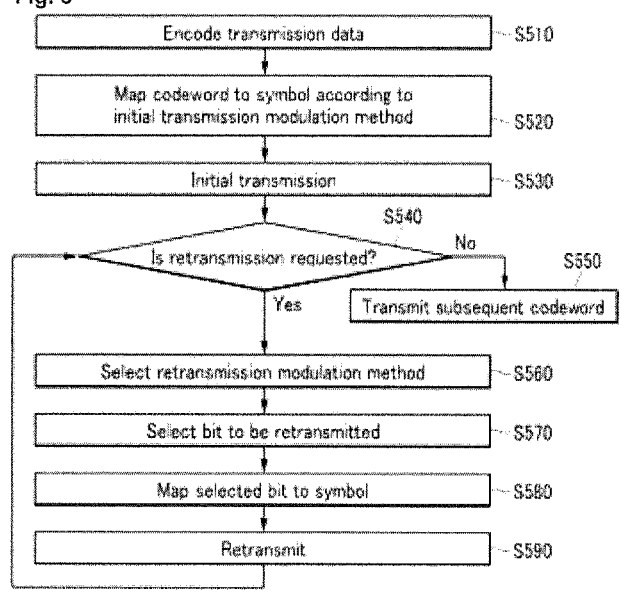
Fig. 5

RETRANSMISSION APPARATUS AND METHOD

CROSS REFERENCE TO RELATED APPLICATIONS

This application claims the benefit under 35 U.S.C. Section 371, of PCT International Application No. PCT/KR2009/004785, filed Aug. 27, 2009, which claimed priority to Korean Application No. 10-2008-0085928, filed Sep. 1, 2008 and Korean Application No. 10-2009-0072511, filed Aug. 6, 2009, in the Korean Patent Office, the disclosures of which are hereby incorporated by reference.

TECHNICAL FIELD

The present invention relates to a retransmission method and apparatus.

BACKGROUND ART

When a transmitted packet is not normally received at a receiving end in a wireless communication system, a method for retransmitting the corresponding packet is used. A hybrid automatic repeat request (HARQ) is one example of a retransmission method. In the HARQ, a bit error is primarily prevented through forward error correction, and the retransmission of a packet is requested through an automatic repeat request (ARQ) when an error occurs.

The HARQ may be classified into a chase combining HARQ (CC-HARQ) and an incremental redundancy HARQ (IR-HARQ) according to a method for combining retransmitting packets. In the CC-HARQ, a transmitting end retransmits the same packet and a receiving end performs a soft-combining of received packets in a symbol unit or a bit unit and then decodes them. In the IR-HARQ, the transmitting end retransmits redundancy bits that have been punctured in the previous transmission, and the receiving end connects the packet received in the previous transmission and the redundancy bits received in the retransmission and decodes them.

Meanwhile, among modulation methods, a quadrature amplitude modulation (QAM) is a modulation method that converts a plurality of bits of transmission data into phase and amplitude information of one symbol and transmits them. 4-QAM can transmit 2 bits in one symbol, 16-QAM can transmit 4 bits, and 64-QAM can transmit 6 bits in one symbol.

The $2^n$-QAM divides the transmission data by n bit unit, maps them to one of $2^n$ symbols, and modulates and transmits them. At this time, gray mapping is mainly used as a symbol mapping method. When receiving the n bit symbol modulated according to the gray mapping, a difference in reliability of each bit of the received symbol occurs, and in particular, a large difference in reliability occurs in a situation in which a signal-to-noise ratio (SNR) is low. The reliability of the received bits may be represented as an average log likelihood ratio (LLR).

Therefore, a retransmission method for solving the difference in reliability is required.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

Aspects of the present invention provide a retransmission method and apparatus for solving a difference in reliability.

Solution to Problem

According to an aspect of the present invention, a retransmission method by a retransmission apparatus is provided. The retransmission method includes encoding transmission data to output a codeword, mapping at least some bits of the codeword to symbols according to a first modulation method at the time of first transmission, and mapping at least some bits of the codeword to symbols according to a second modulation method that is different from the first modulation method at the time of second transmission after the first transmission.

A retransmission apparatus according to another aspect of the present invention includes a channel coder, a symbol mapper, and a transmitter. The channel coder encodes transmission data to output a codeword. The symbol mapper maps at least some bits of the codeword to symbols according to a first modulation method at the time of initial transmission, and maps at least some bits of the codeword to symbols according to a second modulation method that is different from the first modulation method at the time of retransmission. The transmitter transmits the symbols mapped according to the first modulation method in the initial transmission, and transmits the symbols mapped according to the second modulation method in the retransmission.

A retransmission method according to yet another aspect of the present invention includes: encoding transmission data to output a codeword; mapping at least some bits of the codeword to symbols according to a first modulation method at the time of initial transmission; selecting a second modulation method for retransmission; selecting bits to be retransmitted among the codeword, at a low order in reliabilities that are allocated through the initial transmission; and mapping the selected bits to the symbols according to the second modulation method.

BRIEF DESCRIPTION OF DRAWINGS

FIG. 3 is a diagram showing one example of a 64-QAM constellation.

FIG. 4 is a schematic block diagram of a retransmission apparatus according to an embodiment of the present invention.

FIGS. 5 and 8 are schematic flow charts of a retransmission method according to an embodiment of the present invention.

MODE FOR THE INVENTION

Figure 1:
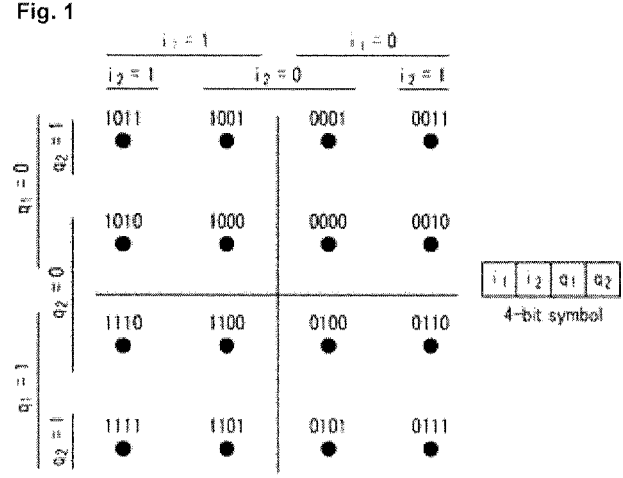
FIG. 1 is a diagram showing one example of a 16-QAM constellation.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

The reliability of respective bits in the symbol when modulating the transmission data will now be described with reference to FIG. 1, FIG. 2 and FIG. 3.

Figure 2:
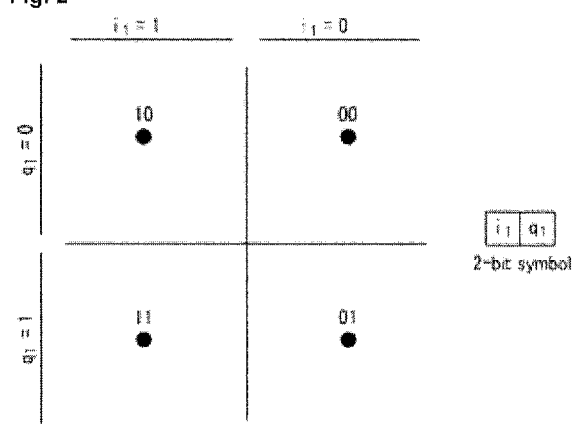
FIG. 2 is a diagram showing one example of a 4-QAM constellation.

FIG. 1 shows one example of a 16-QAM constellation, FIG. 2 shows one example of a 4-QAM constellation, and FIG. 3 shows one example of a 64-QAM constellation.

Referring to FIGS. 1 to 3, in a gray mapping constellation, a value of one bit between adjacent symbols is different and values of the remaining bits therebetween are the same. The gray mapping constellation may exist in plural for each modulation method, and FIGS. 1 to 3 each show one example of a gray mapping constellation for 16-QAM, 4-QAM, and 16-QAM, respectively.

In the 16-QAM constellation of FIG. 1, 4 bits arranged in order of $i_1$, $q_1$, $i_2$, and $q_2$ form one QAM symbol. In the 4-QAM constellation of FIG. 2, 2 bits arranged in order of $i_1$ and $q_1$ form one QAM symbol. In the 64-QAM constellation of FIG. 3, 6 bits arranged in order of $i_1$, $q_1$, $i_2$, $q_2$, $i_3$, and $q_3$ form one QAM symbol. Herein, bits $i_1$, $i_2$, and $i_3$ are in-phase components, and bits $q_1$, $q_2$, and $q_3$ are quadrature components.

Table 1 indicates a mathematical approximate value of an average LLR of bits $i_1$ and $i_2$ mapped as the in-phase components of the QAM symbol by the 16-QAM constellation shown in FIG. 1.

TABLE 1

| Symbol ($i_1q_1i_2q_2$) | Average value of x | Average LLR $i_1$ | Average LLR $i_2$ |
|---|---|---|---|
| $0q_10q_2$ | $x_0$ | $-4Kx_0^2 = -\lambda$ | $-4Kx_0^2 = -\lambda$ |
| $0q_11q_2$ | $x_1$ | $-12Kx_0^2 = -3\lambda$ | $4Kx_0^2 = \lambda$ |
| $1q_10q_2$ | $-x_0$ | $4Kx_0^2 = \lambda$ | $-4Kx_0^2 = -\lambda$ |
| $1q_11q_2$ | $-x_1$ | $12Kx_0^2 = 3\lambda$ | $4Kx_0^2 = \lambda$ |

Herein, is a coordinate of the x axis (i.e., horizontal axis) of the received symbol, $-x_1$, $-x_0$, $x_0$, and $x_1$ represent coordinates of four x's in the direction from the left to the right in FIG. 1, the average of x is provided assuming that received noise is white noise with the average 0, and K is a constant.

Referring to Table 1, it can be appreciated that an average (hereinafter referred to as "average of LLR size") of an absolute value of an average LLR of a first bit $i_1$ of bits mapped as the in-phase component is about twice as large as an average of LLR size of the second bit $i_2$. Similarly, an average of LLR size of the first bit $q_1$ of bits mapped as the quadrature component is also about twice as large as an average of LLR size of the second bit $q_2$. As such, the average of LLR size of each bit, that is, reliability, in the 16-QAM may vary according to the position thereof.

Meanwhile, Table 1 indicates a case where the received noise is assumed to be white noise, that is, the SNR is assumed to be high. The difference in reliability between bits may be large in the case where the SNR is low, which actually causes a significant error.

Tables 2, 3, and 4 each indicate simulation results of the average LLR according to the SNR in the 4-QAM, 16-QAM, and 64-QAM.

TABLE 2

| SNR | Symbol $i_1q_1$ | Average LLR $i_1$ | Symbol LLR |
|---|---|---|---|
| 0 dB | $0q_1$ | −2.0 | |
| | $1q_1$ | 2.0 | |
| | Average of LLR size | 2.0 | 2.0 |
| 3 dB | $0q_1$ | −3.99 | |
| | $1q_1$ | 3.99 | |
| | Average of LLR size | 3.99 | 3.99 |
| 6 dB | $0q_1$ | −7.96 | |
| | $1q_1$ | 7.96 | |
| | Average of LLR size | 7.96 | 7.99 |

TABLE 3

| SNR | Symbol ($i_1q_1i_2q_2$) | Average LLR $i_1$ | Average LLR $i_2$ | Symbol LLR |
|---|---|---|---|---|
| 0 dB | $0q_10q_2$ | −2.03 | −0.28 | |
| | $0q_11q_2$ | −0.67 | 0.23 | |
| | $1q_11q_2$ | 0.67 | 0.23 | |
| | $1q_10q_2$ | 2.03 | −0.28 | |
| | Average of LLR size | 1.35 | 0.255 | 1.61 |
| 3 dB | $0q_10q_2$ | −3.68 | −0.72 | |
| | $0q_11q_2$ | 1.17 | 0.58 | |
| | $1q_11q_2$ | 1.17 | 0.58 | |
| | $1q_10q_2$ | 3.68 | −0.72 | |
| | Average of LLR size | 2.425 | 0.65 | 3.075 |
| 6 dB | $0q_10q_2$ | −6.77 | −1.57 | |
| | $0q_11q_2$ | −1.96 | 1.37 | |
| | $1q_11q_2$ | 1.96 | 1.37 | |
| | $1q_10q_2$ | 6.77 | −1.57 | |
| | Average of LLR size | 4.365 | 1.47 | 5.835 |

TABLE 4

| SNR | Symbol ($i_1q_1i_2q_2i_3q_3$) | Average LLR $i_1$ | Average LLR $i_2$ | Average LLR $i_3$ | Symbol LLR |
|---|---|---|---|---|---|
| 0 dB | $0q_10q_20q_3$ | −2.19 | −0.40 | −0.07 | |
| | $0q_10q_21q_3$ | −1.55 | −0.09 | −0.008 | |
| | $0q_11q_20q_3$ | −0.31 | 0.26 | 0.05 | |
| | $1q_10q_20q_3$ | 2.19 | −0.40 | −0.07 | |
| | $1q_11q_20q_3$ | 0.31 | 0.26 | 0.05 | |
| | $1q_10q_21q_3$ | 1.55 | −0.09 | −0.008 | |
| | $0q_11q_21q_3$ | −0.93 | 0.14 | 0.03 | |
| | $1q_11q_21q_3$ | 0.93 | 0.14 | 0.03 | |
| | Average of LLR size | 1.245 | 0.223 | 0.04 | 1.508 |
| 3 dB | $0q_10q_20q_3$ | −3.88 | −0.95 | −0.14 | |
| | $0q_10q_21q_3$ | −2.69 | −0.26 | 0.01 | |
| | $0q_11q_20q_3$ | −0.52 | 0.65 | 0.06 | |
| | $1q_10q_20q_3$ | 3.88 | −0.95 | −0.14 | |
| | $1q_11q_20q_3$ | 0.52 | 0.65 | 0.06 | |
| | $1q_10q_21q_3$ | 2.69 | −0.26 | 0.01 | |
| | $0q_11q_21q_3$ | −1.58 | 0.32 | 0.06 | |
| | $1q_11q_21q_3$ | 1.58 | 0.32 | 0.06 | |
| | Average of LLR size | 2.168 | 0.545 | 0.068 | 2.781 |
| 6 dB | $0q_10q_20q_3$ | −6.89 | −1.91 | −0.07 | |
| | $0q_10q_21q_3$ | −4.55 | −0.58 | −0.008 | |
| | $0q_11q_20q_3$ | −0.81 | 1.45 | 0.05 | |
| | $1q_10q_20q_3$ | 6.89 | −1.91 | −0.07 | |
| | $1q_11q_20q_3$ | 0.81 | 1.45 | 0.05 | |
| | $1q_10q_21q_3$ | 4.55 | −0.58 | −0.008 | |
| | $0q_11q_21q_3$ | −2.54 | 0.64 | 0.03 | |
| | $1q_11q_21q_3$ | 2.54 | 0.64 | 0.03 | |
| | Average of LLR size | 3.698 | 1.145 | 0.04 | 4.883 |

Referring to Tables 3 and 4, there is a difference in the average of the LLR size between bits $i_1$, $i_2$, and $i_3$ such that it can be appreciated that there is a difference in reliability between bits of the QAM symbol in the modulation method such as 16-QAM, 64-QAM, etc., as described with reference to Table 1, However, since one bit $i_1$ of the in-phase component and one bit $q_1$ of the quadrature component exist in the 4-QAM, there is no difference in reliability between the two bits.

Referring to Tables 2 to 4, it can be appreciated that the higher the SNR is, the larger the average of the LLR size becomes. This means that the higher the SNR is, the higher the reliability of bits in the symbol becomes.

Further, the average LLRs indicated in Tables 2 to 4 are results obtained by performing normalization to make average symbol energy 1, such that the average LLR of each bit can indicate the reliability regardless of modulation order. Therefore, upon comparing Table 2 and Table 4, it can be appreciated that the lower the modulation order in the SNR is, the larger the sum of the average of the LLR size of the in-phase component bit, that is, the symbol LLR, becomes. This means that when the modulation order is lowered, the total average reliability of bits obtainable by transmitting one symbol is increased.

Hereinafter, a retransmission method and apparatus according to an embodiment of the present invention will be described in detail with reference to FIGS. 4 to 7.

Figure 6:
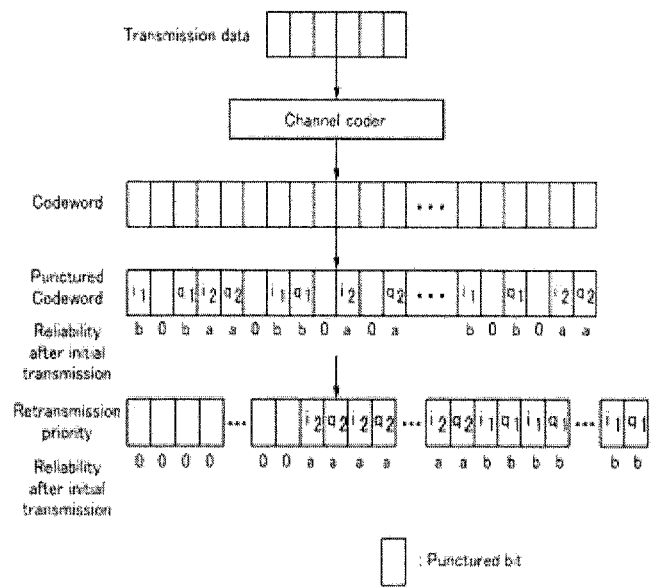
FIGS. 6, 7, and 9 are diagrams showing a method for selecting bits to be retransmitted in the retransmission method according to an embodiment of the present invention.
Figure 7:
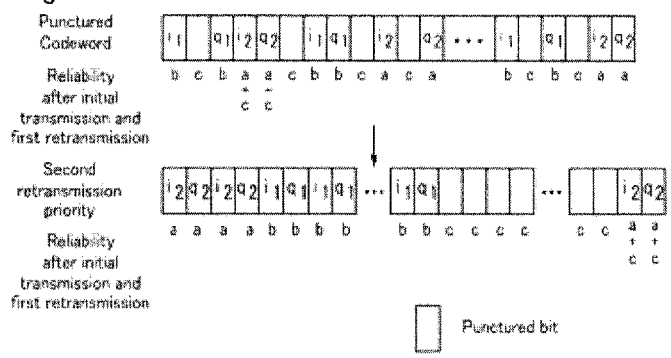

FIG. 4 is a schematic block diagram of a retransmission apparatus according to an embodiment of the present invention, and FIG. 5 is a schematic flow chart of a retransmission method according to an embodiment of the present invention. FIGS. 6 and 7 are each diagrams showing a method for selecting bits to be retransmitted in a retransmission method according to an embodiment of the present invention.

Referring to FIGS. 4 and 5, a retransmission apparatus 400 according to an embodiment of the present invention includes a channel coder 410, a symbol mapper 420, and a transmitter 430.

First, the channel coder 410 encodes transmission data (S510). Then, the channel coder 410 outputs a codeword including a plurality of information bits and a plurality of redundancy bits added to the plurality of information bits. The information bits are bits corresponding to the transmission data before encoding, and the redundancy bits are bits including the redundancy information on the transmission data. The symbol mapper 420 maps the codeword 620 to a plurality of symbols using a modulation method (for example 16-QAM) for initial transmission (S520). Before the symbol mapper 420 performs a symbol mapping, a part of the redundancy bits may be punctured and the information bits and the redundancy bits may be interleaved. The transmitter 430 transmits a packet including the mapped symbols to a receiving end (initial transmission) (S530).

In FIG. 6, it is assumed that the symbol mapper 420 maps the codeword to the symbols according to, for example, the 16-QAM constellation of FIG. 1, and a part of the redundancy bits of the codeword is punctured. In this case, assuming that the reliability of bits allocated to bits $i_1$ and $q_1$ of the QAM symbol is b, the reliability of bits allocated to bits $i_2$ and $q_2$ of the QAM symbol is a, the size of reliability is b>a>0.

Referring again to FIG. 5, when receiving a acknowledge (ACK) from the receiving end, that is, when there is no retransmission request (S540), the retransmission apparatus 400 maps a next codeword to symbols and transmits them (S550). On the other hand, when the transmitter 430 receives a negative acknowledge (NAK), that is, the retransmission request, from the receiving end (S540), the symbol mapper 420 selects a modulation method (hereinafter referred to as "retransmission modulation method") to be used for a retransmission (S560), and also selects bits to be retransmitted among the codeword (S570). Next, the symbol mapper 420 maps the bits to retransmit according to the retransmission modulation method to the symbol (S580), and the transmitter 430 transmits the packet including the mapped symbols to the receiving end (first retransmission) (S590).

The symbol mapper 420 may select a modulation method with a lower modulation order than that of the modulation method used for the initial transmission as the retransmission modulation method. As described above, the lower the modulation order is, the higher the sum of the average reliability (symbol reliability) per bit within the symbol becomes. Accordingly, the total reliability of the entire codeword can be improved. In this case, the symbol mapper 420 may select the modulation method having no difference in the reliabilities between the bits as in the 4-QAM. In the case where the symbol mapper 420 selects the modulation method with the modulation order lower than that of the initial transmission, since the number of bits that are capable of being transmitted in the retransmission is lower than that of the initial transmission, the symbol mapper 420 preferentially maps bits that have been mapped to bits with the low reliability in the initial transmission to symbols.

For example, as shown in FIG. 6, since the reliability of the bits punctured in the initial transmission is lowest, the symbol mapper 420 preferentially selects the bits punctured in the initial transmission and maps the bits to the symbols. Next, the symbol mapper 420 selects the bits mapped to the bits $i_2$ and $q_2$ in the initial transmission in a next priority and maps the selected bits to the symbols, and finally selects the bits mapped to the bits $i_1$ and $q_1$. In fact, in the case of using the 16-QAM in the initial transmission and the 4-QAM in the first retransmission, a portion of the bits mapped to the bits $i_2$ and $q_2$ and the bits mapped to the bits $i_1$ and $q_1$ in the initial transmission may not be transmitted in the first retransmission.

Referring to FIG. 5 again, in the case where the transmitter 430 receives the retransmission request from the receiving end after the first retransmission (S540), the symbol mapper 420 and the transmitter 430 retransmit the packet through the steps S560 to S590 (the second retransmission).

The symbol mapper 420 may also select a modulation method (e.g., 4-QAM) with a lower modulation order than that of the modulation method used for the initial transmission as the retransmission modulation method in the second retransmission. The symbol mapper 420 preferentially selects the bits, to which the low reliability has bee allocated, based on the reliability allocated to each bit of the codeword through the initial transmission and the first retransmission, and maps the bits to the symbols.

For example, as shown in FIG. 7, assuming that the reliability of the bit transmitted through the first retransmission is c, since an average reliability of each bit in the 4-QAM symbol is higher than that of each bit in the 16-QAM symbol, c>b>a>0. Comparing the reliabilities after the initial transmission and the first retransmission, the reliability of the bits transmitted in the first retransmission among the bits mapped to the bits $i_2$ and $q_2$ in the initial transmission is a+c, the reliability of the bits transmitted only in the first retransmission (the bits punctured in the initial transmission) is c, the reliability of the bits mapped to the bits $i_1$ and $q_1$ in the initial transmission is b, and the reliability of the bits not transmitted in the first retransmission among the bits mapped to the bits $i_2$ and $q_2$ in the initial transmission is a. In this case, since (a+c)>c>b>a, the symbol mapper 420 preferentially selects the bits to which the low reliability has been allocated through the initial transmission and the first retransmission and maps the selected bits to the symbols.

In the case where the retransmission request is received from the receiving end after the second retransmission, the symbol mapper 420 and the transmitter 430 may retransmit the packet in consideration of the reliabilities allocated through the initial transmission and the first and second retransmissions.

As described above, according to the embodiment of the present invention, the modulation method in which the symbol reliability increases is selected at the time of the retransmission, so that in the case of combining the codeword received in the initial transmission and the retransmission, a sum of the total bit reliability of the combined codeword may increase. In addition, the bit transmitted at a relatively low reliability is preferentially retransmitted, thereby making it possible to reduce the number of bits with the low reliability within the codeword combined in the receiving end. Therefore, it is possible to reduce the error rate at the time of decoding.

Meanwhile, although a case of using 16-QAM in the initial transmission and 4-QAM in the retransmission has been described by way of example with reference to FIGS. 6 and 7 in the embodiment of the present invention, other modulation methods may be applied to the retransmitting apparatus and the retransmitting method according to an embodiment of the present invention. For example, in the case of using the 64-QAM shown in FIG. 3 in the initial transmission, since the reliabilities increase in order of the punctured bits, the bits allocated to bits $i_3$ and $q_3$, the bits allocated to bits $i_2$ and $q_2$, and the bits allocated to bits $i_1$ and $q_1$, it is possible to select the bits to be retransmitted based on these reliabilities.

Figure 8:
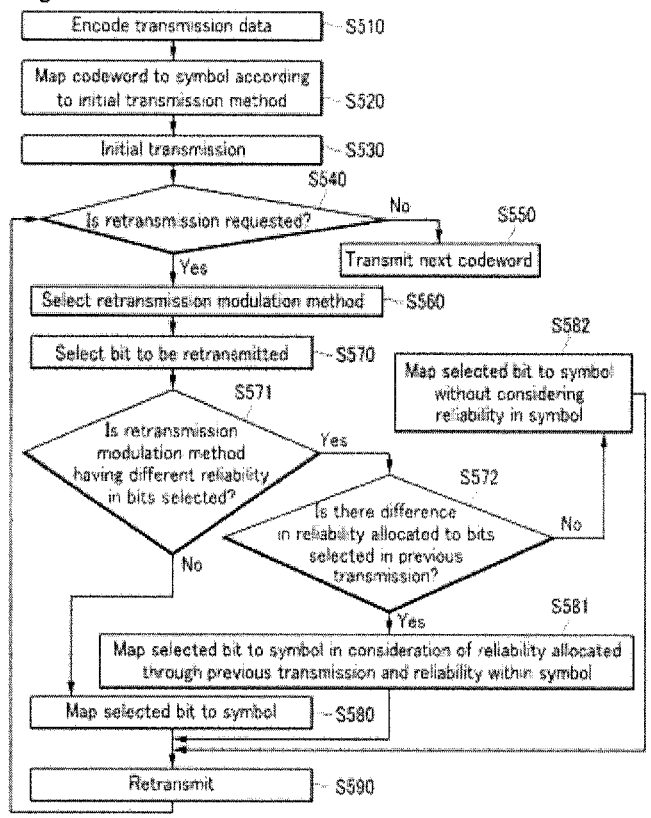

FIG. 8 is a schematic flowchart of a retransmission method according to another embodiment of the present invention.

When selecting the retransmission modulation method and bits to be retransmitted in the symbol mapper 420 (S560 and S570), a modulation method with a difference in reliabilities between bits such as 16-QAM, 64-QAM, etc., may be selected as the retransmission modulation method, and the same reliability may be allocated to the bits to be retransmitted through the previous transmission.

Referring to FIG. 8, the symbol mapper 420 may select the modulation method with the difference in the reliabilities between the bits as the retransmission modulation method (S571). In this case, when there is a difference between the reliabilities allocated to the bits to be retransmitted through the previous transmission (S572), the symbol mapper 420 maps the bits to be retransmitted to the symbols in consideration of the reliability allocated through the previous transmission and the reliability of each bit within the symbol (S581). Specifically, the symbol mapper 420 maps the bit to which the low reliability has been allocated through the previous transmission to the bit with the high reliability within the symbol, and maps the bit to which the high reliability has been allocated through the previous transmission to the bit with the low reliability within the symbol (S581).

On the other hand, when there is no difference between the reliabilities allocated to the bits to be retransmitted through the previous transmission (S572), the symbol mapper 420 may map the bits to be retransmitted to the symbols without considering the reliability within the symbol (S582).

Figure 9:
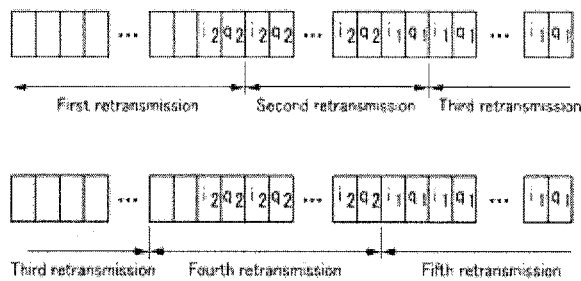

FIG. 9 is a view schematically showing a method that selects bits to be retransmitted in a retransmission method according to another embodiment of the present invention.

Although an example in which the bits to retransmit are selected in consideration of all of the previous transmissions at the time of the retransmission has been described in the embodiments described with reference to FIGS. 5 to 7, the bits to be retransmitted may be selected in consideration of only the initial transmission.

Referring to FIG. 9, the symbol mapper 420 determines the priority according to magnitude of the reliability allocated at the initial transmission as illustrated in FIG. 6, and sequentially selects the bits to which the low reliability has been allocated as the bits to be retransmitted. That is, the symbol mapper 420 sequentially selects the bits to which the lowest reliability has been allocated and maps the selected bits to the symbols in the first retransmission, and sequentially selects the bits next to the bits selected in the first retransmission and maps the selected bit to the symbols in the second retransmission. After the retransmitting apparatus maps all bits in the codeword to the symbols in this manner and transmits them, the symbol mapper 420 starts again to sequentially select the bits to which the lowest reliability has been allocated in the initial transmission and maps the selected bits to the symbols. In this case, since it is not necessary to calculate reliability and determine the priority whenever the retransmission is performed, it is possible to reduce complexity.

Meanwhile, although the IR-HARQ in which the redundancy bits punctured in the initial transmission are transmitted in the retransmission by way of example in the embodiment of the present invention, other retransmission methods may be applied to the embodiment of the present invention. For example, in the case of using a CC-HARQ, the retransmitting apparatus retransmits the bits transmitted in the initial transmission except for the bits punctured in the initial transmission. In this case, the retransmitting apparatus may select the bits to be retransmitted by applying priority for bits except for the bits punctured in the codeword.

As described above, with the embodiments of the present invention, a modulation method that increases the symbol reliability at the time of the retransmission is selected, such that when the codewords received in the initial transmission and the retransmission are combined at the receiving end, the sum of total bit reliability of the combined codeword can be increased.

With the embodiments of the present invention, the bits transmitted at relatively low reliability in the previous transmission or the initial transmission are preferentially retransmitted, such that the number of bits having the low reliability within the codeword combined in the receiving end can be reduced and the error rate can thus be reduced at the time of decoding.

The above-mentioned embodiments of the present invention are not embodied only by an apparatus and/or method. Alternatively, the above-mentioned embodiments may be embodied by a program performing functions that correspond to the configuration of the embodiments of the present invention, or a recording medium on which the program is recorded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A retransmission method by a retransmission apparatus, the method comprising:
   encoding transmission data to output a codeword;
   mapping a number of at least some bits of the codeword to symbols according to a first modulation method at the time of first transmission; and mapping a different number of the at least some bits of the codeword to symbols according to a second modulation method at the time of second transmission after the first transmission, the second modulation method being different from the first modulation method,
wherein a sum of average reliability per bit of symbol according to the second modulation is larger than a sum of average reliability per bit of symbol according to the first modulation method.

2. The method of claim 1, wherein the second modulation method has a lower modulation order than that of the first modulation method.

3. The method of claim 2, wherein the first transmission is initial transmission.

4. The method of claim 1, wherein the mapping according to the second modulation method comprises:
selecting bits to be transmitted among the codeword, at a low order in reliabilities that are allocated through a transmission previous to the second transmission; and
mapping the selected bits to the symbols.

5. The method of claim 1, further comprising mapping at least some bits of the codeword to symbols according to a third modulation method that is different from the first modulation method at the time of third transmission after the second transmission.

6. The method of claim 5, wherein the third modulation method is the same as the second modulation method.

7. The method of claim 5, wherein the mapping according to the second modulation method comprises:
selecting bits to be transmitted in the second transmission among the codeword, at a low order in reliabilities that are allocated through the first transmission; and
mapping the selected bits for the second transmission to symbols, and the mapping according to the third modulation method comprises:
selecting bits to be transmitted in the third transmission among bits that are not selected through the second transmission in the codeword, at a low order in reliabilities that are allocated through the first transmission, and
mapping the bits to be transmitted in the third transmission to the symbols.

8. The method of claim 1, wherein the second modulation method is a modulation method in which bits have different reliability according to their positions within a symbol, and the mapping according to the second modulation method comprises:
selecting bits to be transmitted in the second transmission among the codeword;
mapping a bit to which relatively high reliability is allocated through a previous transmission among the selected bits to a bit to which relatively low reliability is allocated within the symbol; and
mapping a bit to which relatively low reliability is allocated through the previous transmission among the selected bits to a bit to which relatively high reliability is allocated within the symbol.

9. The method of claim 1, wherein the reliability becomes high as the average log likelihood ratio (LLR) is increased.

10. The method of claim 1, wherein the second transmission is retransmission according to a hybrid automatic retransmit request (HARQ).

11. A retransmission apparatus comprising:
a channel coder that encodes transmission data to output a codeword;
a symbol mapper that maps a number of at least some bits of the codeword to symbols according to a first modulation method at the time of initial transmission and maps a different number of the at least some bits of the codeword to symbols according to a second modulation method at the time of retransmission, the second modulation method being different from the first modulation method; and
a transmitter that transmits the symbols mapped according to the first modulation method in the initial transmission and transmits the symbols mapped according to the second modulation method in the retransmission,
wherein a sum of average reliability per bit of symbol according to the second modulation is larger than a sum of average reliability per bit of symbol according to the first modulation method.

12. The apparatus of claim 11, wherein the second modulation method has a lower order than that of the first modulation method.

13. The apparatus of claim 11, wherein the symbol mapper selects bits among the codeword at a low order in reliabilities that are allocated through the initial transmission and maps the selected bits to symbols for the retransmission.

14. The apparatus of claim 11, wherein the symbol mapper selects bits to be transmitted in the second retransmission among the codeword, at a low order in reliabilities that are allocated through the initial transmission and the first retransmission, and maps the selected bits to the symbols for the second retransmission.

15. The apparatus of claim 11, wherein the symbol mapper selects bits to be transmitted in the second retransmission among bits that are not selected through the first retransmission in the codeword, at a low order in reliabilities that are allocated through the initial transmission, and maps the selected bits to the symbols for the second retransmission.

16. A retransmission method by a retransmission apparatus, the method comprising:
encoding transmission data to output a codeword;
mapping a number of at least some bits of the codeword to symbols according to a first modulation method at the time of initial transmission;
selecting a second modulation method for retransmission;
selecting a different number of at least some bits of the codeword to be retransmitted among the codeword, at a low order in reliabilities that are allocated through the initial transmission; and
mapping the selected bits to the symbols according to the second modulation method,
wherein a sum of average reliability per bit of symbol according to the second modulation is larger than a sum of average reliability per bit of symbol according to the first modulation method.

17. The method of claim 16, wherein the second modulation method has a lower order than that of the first modulation method.

18. The method of claim 16, further comprising:
selecting a third modulation method for the second retransmission;
selecting bits to be retransmitted in the second retransmission among the codeword, at low order in reliabilities that are allocated through the initial transmission and the first retransmission; and
mapping the selected bits for the second retransmission to the symbols according to the third modulation method.

19. The method of claim 16, further comprising:
selecting the third modulation method for the second retransmission;
selecting the bits to be retransmitted in the second retransmission among bits that are not selected through the first retransmission in the codeword, at low order in reliabilities allocated through the initial transmission; and mapping the selected bits for the second retransmission to the symbols according to the third modulation method.

\* \* \* \* \*